Nov. 23, 1954     J. BOWEN     2,695,125
CAP FEEDING AND JAR CAPPING APPARATUS
Filed May 6, 1952     12 Sheets-Sheet 1
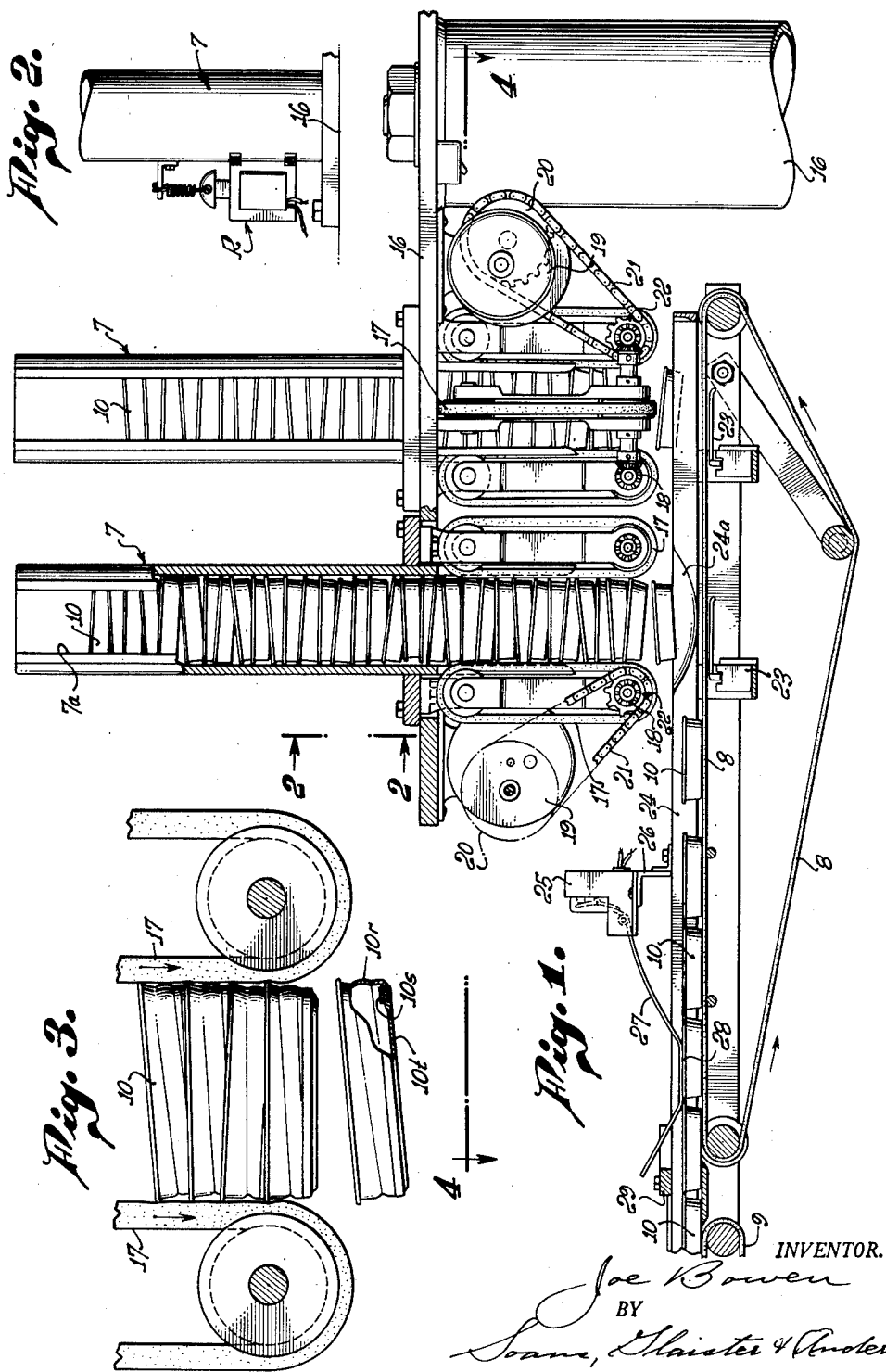
INVENTOR.
Joe Bowen
BY
Soans, Blaister & Anderson
ATTORNEYS.

Nov. 23, 1954        J. BOWEN        2,695,125
CAP FEEDING AND JAR CAPPING APPARATUS
Filed May 6, 1952        12 Sheets-Sheet 2
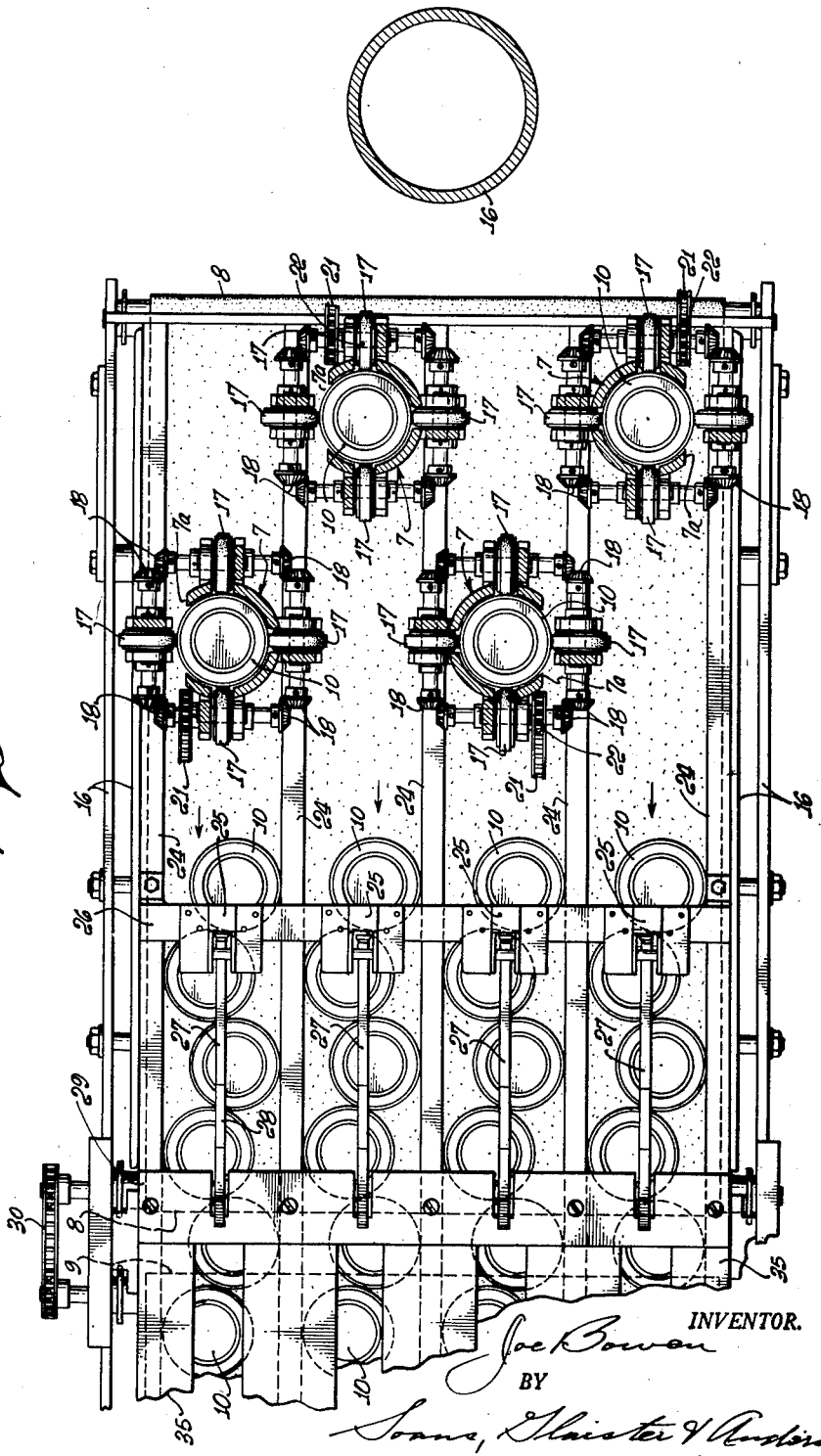
INVENTOR.
Joe Bowen
BY
Soans, Glaister & Anderson
ATTORNEYS.

Nov. 23, 1954  J. BOWEN  2,695,125
CAP FEEDING AND JAR CAPPING APPARATUS
Filed May 6, 1952  12 Sheets-Sheet 3

INVENTOR.
Joe Bowen
BY
Soans Maister & Anderson
ATTORNEYS.

Joe Bowen, INVENTOR.
BY
Evans, Glaister & Anderson
ATTORNEYS.

Nov. 23, 1954

J. BOWEN 2,695,125

CAP FEEDING AND JAR CAPPING APPARATUS

Filed May 6, 1952

Joe Bowen
INVENTOR.

BY
Soans, Shuster & Anderson
ATTORNEYS.

Nov. 23, 1954  J. BOWEN  2,695,125
CAP FEEDING AND JAR CAPPING APPARATUS
Filed May 6, 1952  12 Sheets-Sheet 6

Joe Bowen
INVENTOR.

BY
ATTORNEYS.

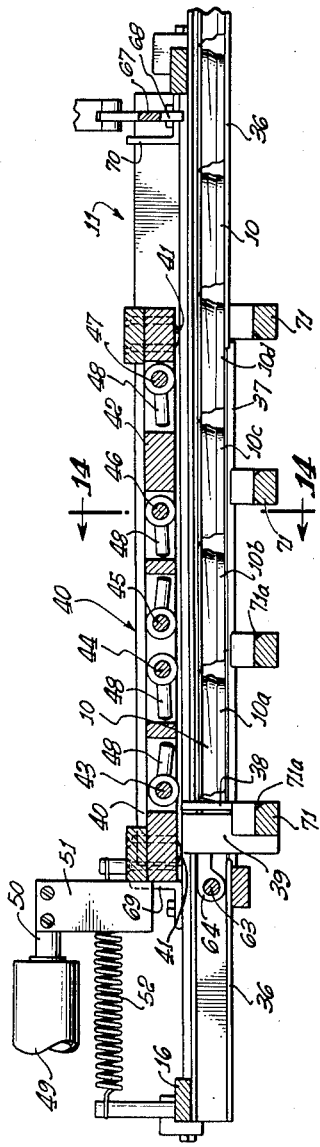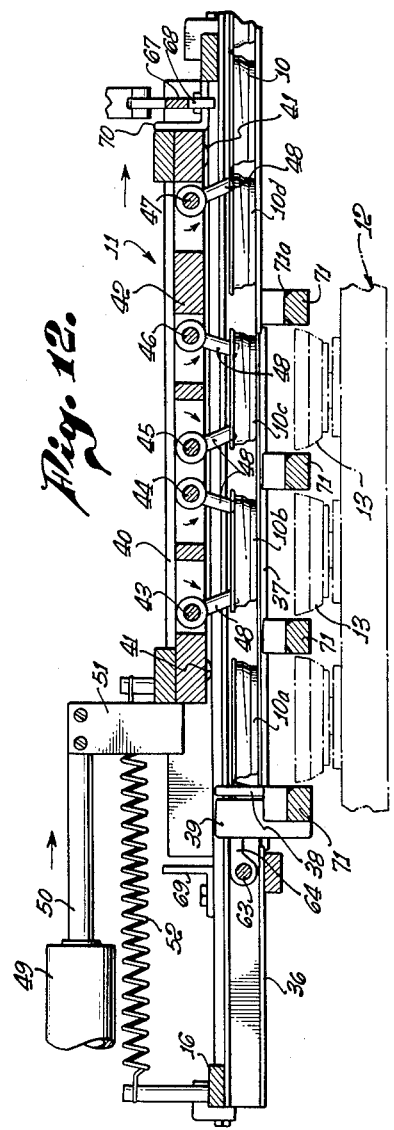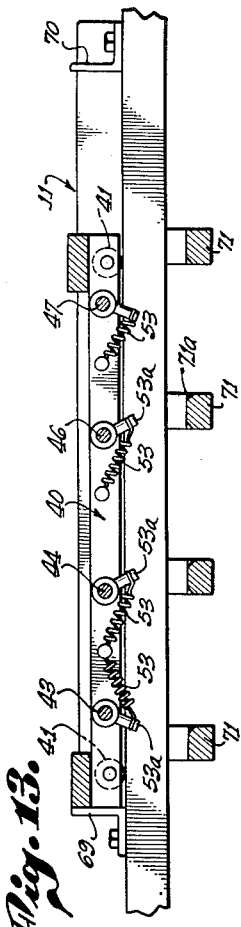

Nov. 23, 1954   J. BOWEN   2,695,125
CAP FEEDING AND JAR CAPPING APPARATUS
Filed May 6, 1952   12 Sheets-Sheet 8
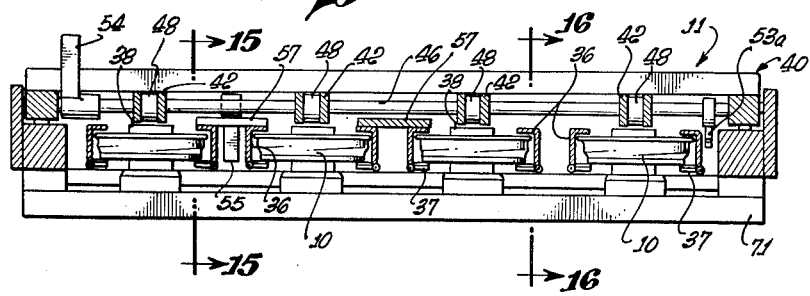
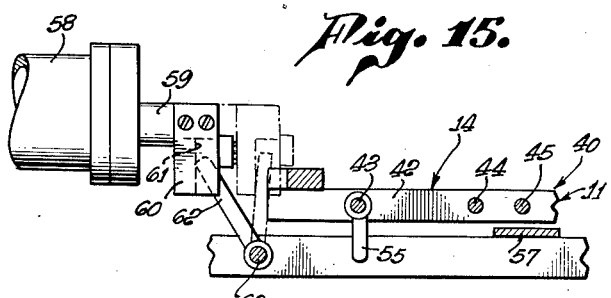
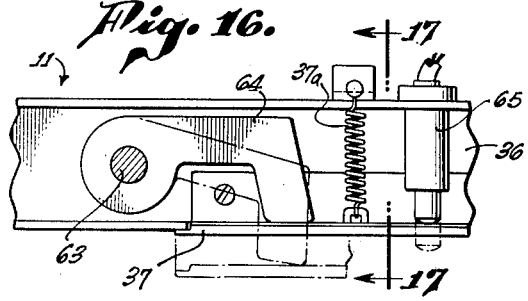
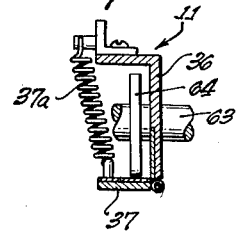
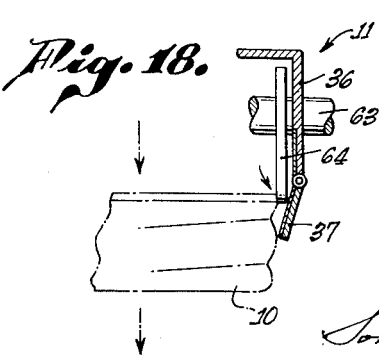
Joe Bowen
INVENTOR.
BY
Soans Christer & Anderson
ATTORNEYS.

Nov. 23, 1954   J. BOWEN   2,695,125
CAP FEEDING AND JAR CAPPING APPARATUS
Filed May 6, 1952   12 Sheets-Sheet 9
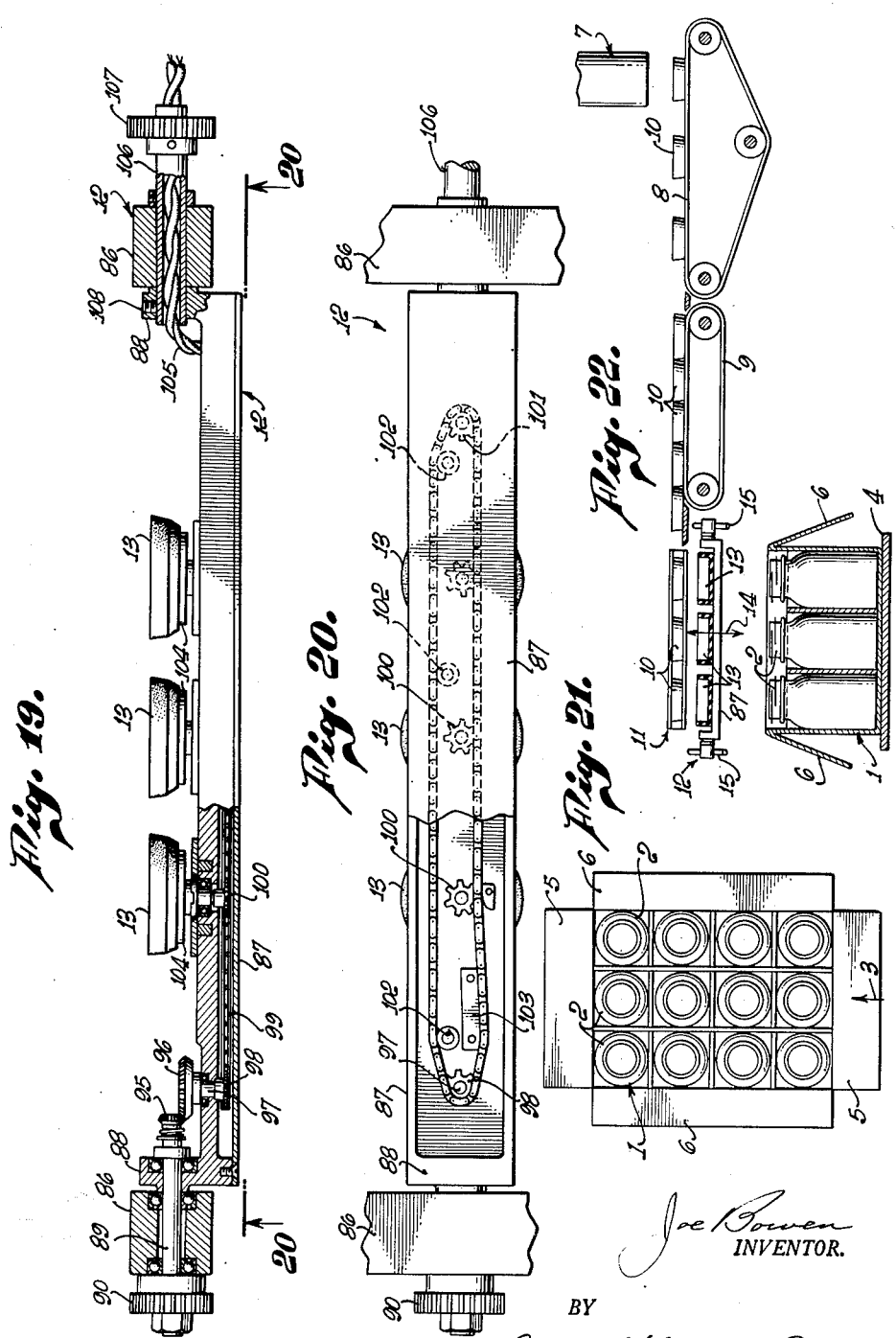

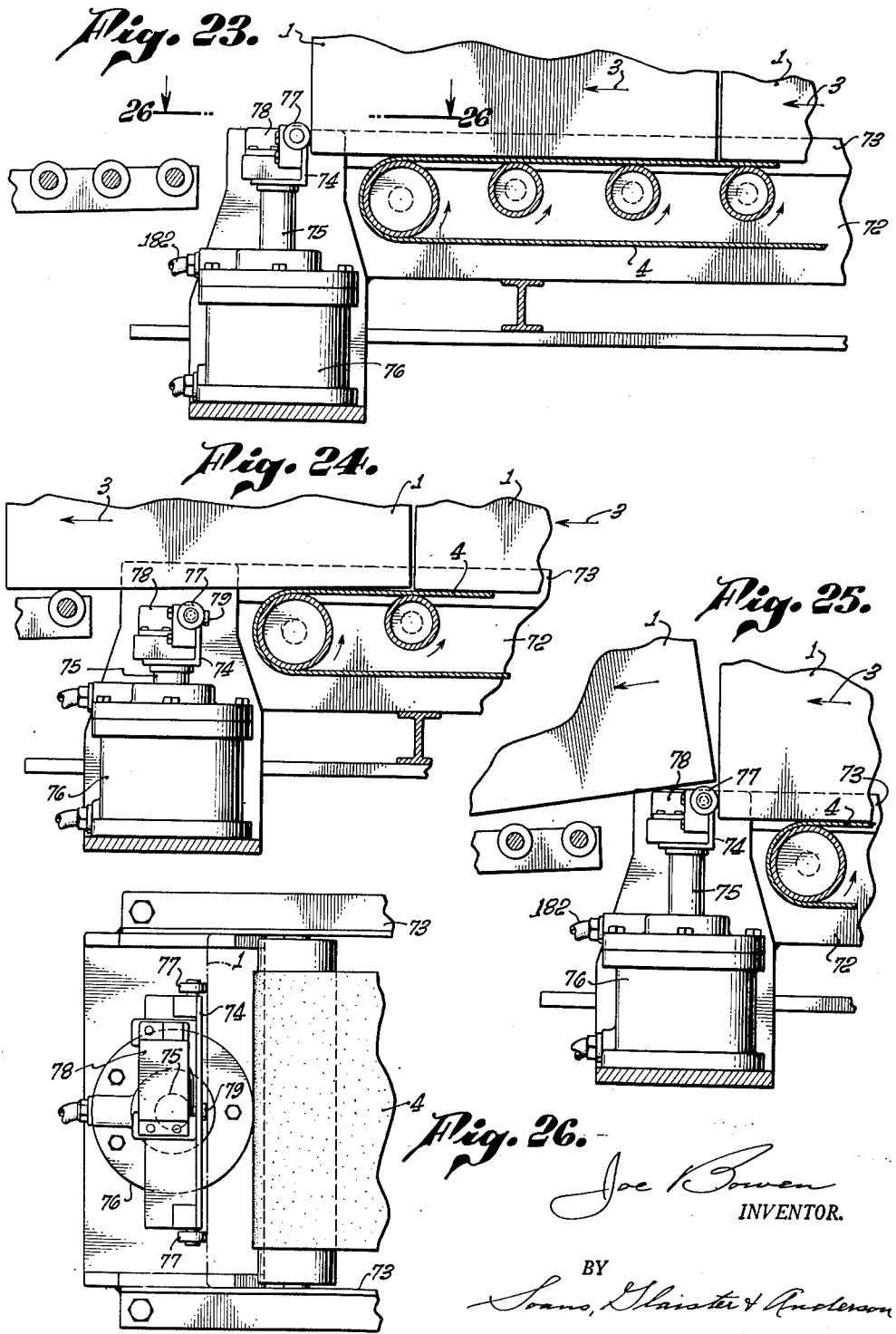

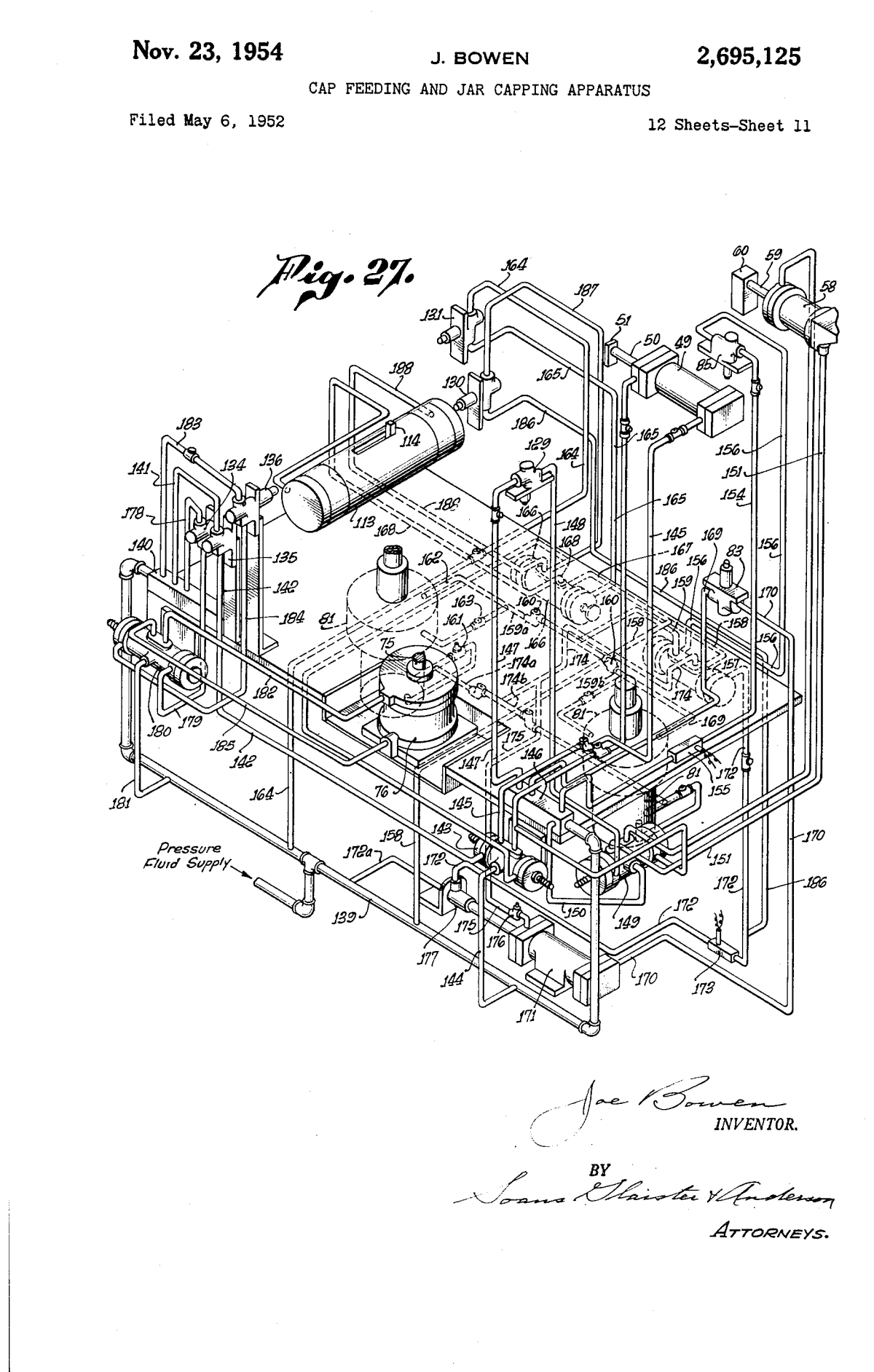

Nov. 23, 1954      J. BOWEN      2,695,125

CAP FEEDING AND JAR CAPPING APPARATUS

Filed May 6, 1952      12 Sheets-Sheet 11

Fig. 27.

INVENTOR.

Joe Bowen

BY

ATTORNEYS.

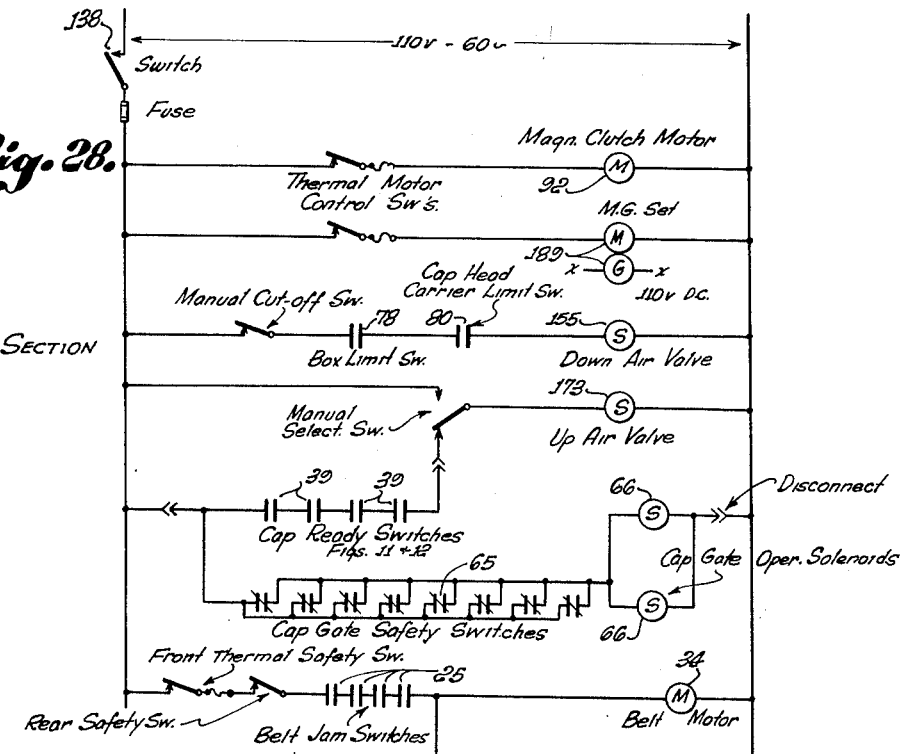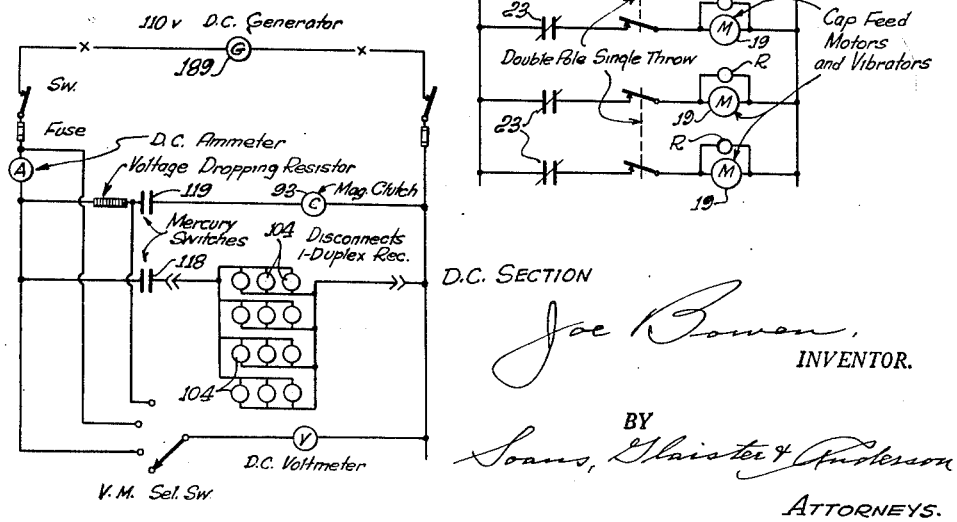

United States Patent Office 2,695,125
Patented Nov. 23, 1954

2,695,125

CAP FEEDING AND JAR CAPPING APPARATUS

Joe Bowen, Huntington, W. Va., assignor to Alexander H. Kerr and Company, Incorporated, Los Angeles, Calif., a corporation of Nevada Application May 6, 1952, Serial No. 286,277

14 Claims. (Cl. 226—88)

This application is concerned with apparatus for applying caps to glass jars of the kind commonly used for home canning of fruits, vegetables, etc., these jars being formed with an externally screw-threaded mouth end for receiving a closure cap.

This application is more particularly concerned with apparatus for use in factories where the jars are made. It is the practice in some of the factories to assemble open-mouthed jars in cartons, say twelve jars to a carton, and to apply caps to the jars so that when the case or carton of jars reaches the purchaser, they will be complete with caps, and also, the interiors of the jars will have been kept factory clean.

As already indicated, the apparatus forming the subject matter of this application applies caps to a predetermined number of jars, for example, twelve jars contained in a paperboard container or shipping carton wherein the jars are held in predetermined orderly relationship.

This application is in part a continuation of my copending application, Serial No. 131,604, filed December 7, 1949. The present application, however, discloses and claims certain improvements in respect of cap feeding mechanism and in respect of some of the details of the cap applying mechanism.

The main objects of the present invention are to provide an improved mechanism for feeding caps from assembled stacks of caps into feed lines from which they are fed to mechanism for applying the caps to jars; to provide means for receiving the caps from the feed means and to position the caps in spaced relation corresponding to the spacing of the jars in the carton; to provide means for delivering the spaced caps to mechanism (such as that shown in my said copending application) for applying the caps to the jars; and to provide improved means for actuating and controlling the operation of such cap applying mechanism.

Other objects and advantages of the invention will be understood by reference to the following specification and the accompanying drawings of which there are twelve (12) sheets.

In the drawings:

Figure 1 is in part a side elevation and in part a longitudinal section through my improved cap feeding mechanism;

Figure 2 is an elevational view taken in the plane represented by the line 2—2 of Figure 1;

Figure 3 is an enlarged detail corresponding to a portion of Figure 1 to show somewhat more clearly the feeding of the caps one by one from a magazine to a conveyor belt;

Figure 4 is a plan section on the line 4—4 of Figure 1;

Figure 11 is a section on the lines 11—11 of Figures 6 and 9;

Figure 12 is a view similar to Figure 11 but showing certain of the parts in a changed position;

Figure 13 is a section on the line 13—13 of Figure 6;

Figure 14 is a section on the lines 14—14 of Figures 6 and 11;

Figure 15 is a section on the lines 15—15 of Figures 6 and 14;

Figure 16 is a section on the line 16—16 of Figure 14;

Figure 17 is a section on the line 17—17 of Figure 16;

Figure 18 is a view similar in part to Figure 17 but showing a changed position of certain of the parts;

Figure 19 is a section on the line 19—19 of Figure 7 but showing the parts in a changed position;

Figure 20 is a bottom plan on the plane represented by the line 20—20 of Figure 19, certain parts being shown broken away to more clearly illustrate others;

Figure 21 is a plan view of a carton containing one dozen jars to which caps are to be applied by the mechanism illustrated and described in this application;

Figure 22 is a schematic illustration of the general arrangement and operation of the machine;

Figures 23, 24 and 25 are sectional views illustrating mechanism provided for controlling movement through the cap applying mechanism of cartons containing jars;

Figure 26 is a plan on a plane such as represented by the line 26—26 of Figure 23;

Figure 27 is a diagrammatic illustration of pressure fluid means which actuates the mechanism; and, Figures 28 and 29 are electrical wiring diagrams relating to certain controls for the mechanism, Figure 28 representing an alternating current circuit and Figure 29 a direct current circuit.

Figure 5:
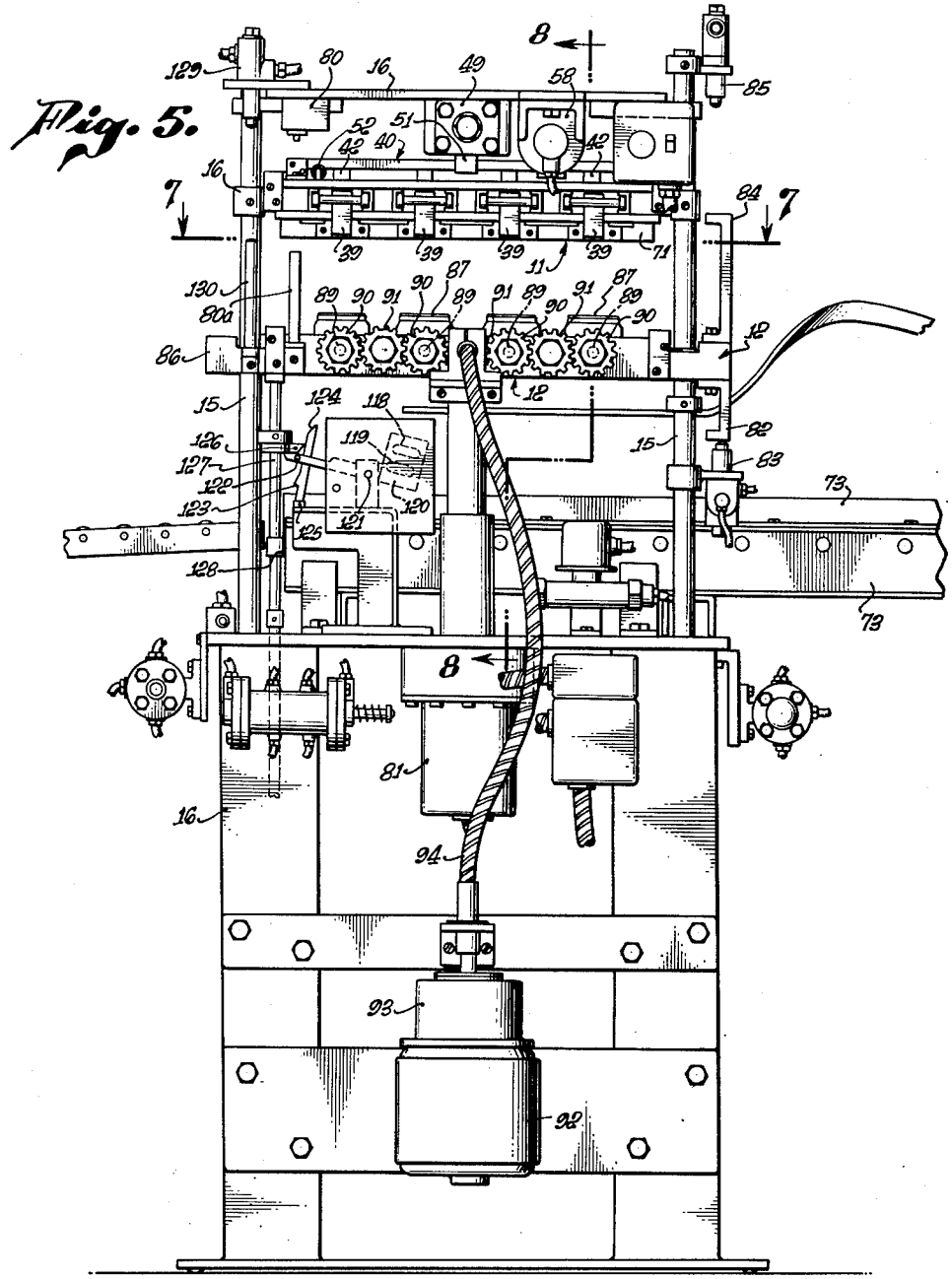
Figure 5 is an end elevation of the end of the machine toward which caps are fed by the feeding mechanism shown in Figure 1.

The purpose of the machine and the general arrangement of its operating mechanism may be understood by reference to Figures 21 and 22.

Figure 21 represents a carton 1 containing one dozen jars 2, arranged in rows extending both crosswise and lengthwise of the carton. The jars are placed in the carton with their open mouth ends up and without caps soon after their manufacture has been completed. The purpose of the apparatus herein referred to is to apply caps to the mouths of the jars 2 in the carton, the caps being screwed on the externally threaded mouth ends. To that end the jar loaded cartons 1 are fed in an endwise direction as indicated by the arrow 3 by means of a conveyor 4 (Figure 22) on which the cartons are placed end to end. The end flaps 5 of the cartons are held folded down against the outer ends of the carton incident to such disposition of the cartons on the conveyor and suitable guide means are provided for holding the side flaps 6 in an open position to provide unobstructed access to the jars.

Caps are applied to the entire dozen jars in a single operation or in other words the caps are applied simultaneously to all of the jars contained in the carton. To that end there are provided a series of cap magazines, one of which is represented at 7 from which caps are deposited in rows on a continuously propelled conveyor belt 8. The cap rows thus deposited on the conveyor 8 correspond in spacing to the spacing of the crosswise extending rows of jars, that is to say, to the jar rows containing three jars in each row. From the conveyor 8, the caps are discharged to a second or intermediate conveyor 9 which travels at a somewhat slower speed than the conveyor 8 so that the caps will be permitted to come into edge to edge engagement as represented in Figure 22 where the caps are designated 10. From the conveyor 9, the caps are delivered to a cap supporting and spacing mechanism 11 which serves to space the caps in accordance with the spacing of the jars 2 in the rows.

From the cap supporting and spacing mechanism 11 the caps are delivered to a vertically reciprocated mechanism 12 which embodies cap receivers or cups 13 arranged in spaced relation corresponding to the spacing of the jars 2. These cap receivers are mounted on a vertically reciprocated frame or carrier 12 in such a manner that during downward movement of the carrier 12 the receivers 13 are rotated 180° from their upwardly facing position as shown in Figure 22 to a downwardly facing position so as to thereby invert the caps to proper position for placement on the mouth ends of the jars. The cap receivers 13 embody magnetic means for retaining the caps in the receivers when they are inverted and mechanism is provided for rotating each of the receivers 13 on its own axis so as to screw the caps home on the jar mouths. In Figure 22 vertical reciprocability of the cap carrier mechanism 12 and 13 is indicated by the double arrow 14, the mechanism being suitably vertically slidably mounted on posts represented at 15.

The described arrangement for inverting the caps for application to the jars is employed so as to facilitate handling or application of two-piece caps such as represented best in Figure 3. As there shown, the caps comprise a rim portion 10r and a top or disc portion 10t which is separate or independent of the rim portion 10r and removable therefrom. This disc portion usually carries a sealing compound 10s on its inside peripheral portion which sealing compound is adapted to engage the mouth end of the jar for forming a tight seal therewith. Inasmuch as the top disc 10t is readily separable from the rim 10r it is advantageous to initially handle the caps in the upwardly facing position illustrated in Figure 22 and in Figure 3 so that no special means is required initially for maintaining the parts of each cap in assembled relationship. It will of course be apparent that one piece or other integrated caps may be employed in place of the separable cap structure just described.

Referring now to Figures 1 to 4 inclusive, it will be seen that the caps 10 are supplied in stacks to four magazines 7 which are in the nature of vertically disposed tubes of a proper diameter to receive and hold the caps in stacked relationship. As indicated, the caps do not normally stack in uniform arrangement but assume a somewhat irregular arrangement as illustrated. This increases the difficulty of delivering caps one by one to the feed belt 8 which underlies the four magazines.

These magazines are supported by being suitably mounted on a part of the frame structure of the machine, all portions of which are designated by the reference numeral 16. The lower portions of the magazine tubes 7 are slotted as best shown in Figures 1 and 4 to permit feed belts 17 to pass through the slots into engagement with the rims of caps for controlling their descent and discharge in and from the magazine tubes 7. As shown, there are preferably four of these feed belts 17 associated with the lower end of each magazine and these belts are suitably guided about pulleys which are rotatably supported by shafts carried by brackets secured to the overlying frame member 16.

The four belts around each magazine are geared together by means of miter gears 18 secured to the ends of the lower pulley shafts so that all of the belts 17 will be driven at the same rate of travel. For practical reasons it is preferred that separate motor drives be provided for the feed belts 17 of each cap magazine 7. Two of such motor drives are shown in Figure 2 wherein electric motors 19 are shown suspended from the overlying frame element 16. These motor units include built-in speed reduction units and a sprocket 20 is mounted on the output shaft of each unit. A driving chain 21 engages the sprocket 20 and also a sprocket 22 on one of the feed belt pulley shafts whereby all of the feed belts will be uniformly driven as already set forth.

The belts 17 are of slightly compressible material and they are adjusted into such position that their inner or adjacent reaches will slightly grip the edges of the caps 10 as best indicated in Figures 3. It will of course be understood that each of the conveyors 17 is so driven that the cap engaging reaches thereof travel downwardly to thereby control the descent of the caps in the magazines. The speed of travel of the belts is also suitably adjusted to cause the caps to be discharged one by one at the required rate for the purposes of other parts of the apparatus. The caps are discharged one by one incident to the diverging travel of the belts 17 about their lower guide pulleys.

A suitable micro-switch 23 is located under the belt 6 in each of the areas in which caps are deposited from the magazines so that in the event that an excess number of caps should for any reason slip from between the belts 17 and impose excessive weight on the upper reach of the belt 8, the underlying switch 23 will be actuated to control an electric circuit which will stop the operation of the cap feed from the affected magazine until proper adjustment is made.

The switches 23 are embodied in circuits with the respective motors which drive the feed belts 17 (see Figure 26) and the said switches are normally closed. In the event that they are opened by the emergency mentioned, the circuit for the corresponding feed belt motor will be broken and the cap feeding apparatus stopped. It may be observed that the switches 23 could, if desired, be arranged to stop the operation of all of the cap feeding devices or of the entire machine, if desired. However, this is not necessary for the reason that there is normally an adequate supply of caps in transit on the belt 8 so that any interruption in the feeding of caps by any one of the magazines can usually be remedied before the supply of caps in transit on the belt is exhausted. Furthermore, it will presently be seen that other devices are provided to stop the operation of the machine in the event that caps are lacking for delivery to the cap carrier mechanism 12 which applies the caps to the jars.

To assist the separation of the caps for discharge one by one from the respective magazines, suitable electrical vibrating devices such as represented at R may be attached to conveniently accessible portions of the magazines as shown in Figure 2. Each magazine 7 is formed with a fairly wide slot 7a which extends the full length of the magazine to facilitate manual loading of caps into the magazine and manual adjustment of the caps in the magazine.

The caps 10 are guided in four rows as shown in Figure 4 between suitable guide strips 24 which are fixedly mounted on the main frame structure in any suitable manner. These guide strips 24 are provided with chamfered portions as shown at 24a to assist in getting the caps down to the belt 8. Such chamfered portions are provided on the guide strips under each cap magazine 7 so as to form more or less of a funnel for the said purpose. In the path of each row of caps there is provided an electric switch 25 mounted on a suitable cross bar 26 supported by the guide members 24 and these switches 25 are controlled by the caps 10 through the agency of actuating arms or levers 27. Normally the operating arms 27 are supported by the caps as indicated at 28 in Figure 1 and a cross bar 29 is provided for limiting the downward movement of said arms in the absence of caps 10. In the event that the caps 10 should pile up or jam up in such a way as to raise the top level of caps above that indicated at 28 for a single layer of caps, the appropriate switch arm 27 will be rocked upwardly and caused to actuate its switch 25 to thereby stop operation of the belt 8.

The belt 8 is driven by a chain drive connection 30 to the intermediate belt 9 as best shown in Figure 4. Said belt 9 is driven by a suitable electric motor which drives a shaft 31 (Figure 8) which acts through a speed reduction gearing unit 32 and a chain drive 33 to drive the said intermediate belt 9. This belt driving motor is indicated at 34 in the wiring diagram, Figure 28.

Figure 6:
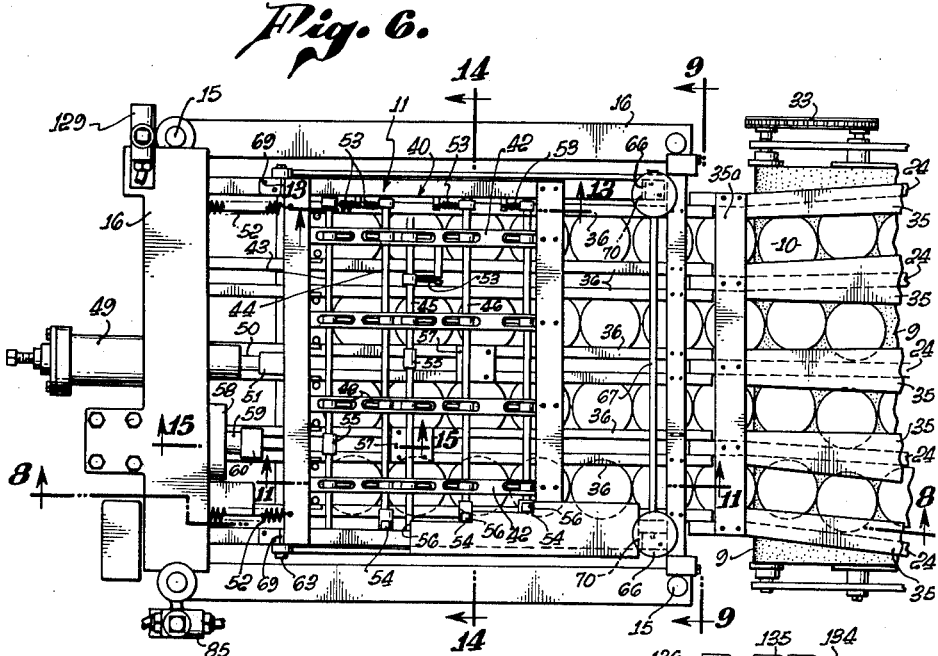
Figure 6 is a plan view of the end portion of the mechanism represented in Figure 5.

As best shown in Figure 6, the guide members 24 at their delivery ends converge somewhat to more perfectly align the caps in rows and to bring the rows into spaced relation conforming to the spacing of the rows of three jars in the cartons (Figure 21). Cap retainers or hold-down strips 35 are secured to the tops of the guides 24 and extend into overlying relation to the cap pathways so as to prevent upward displacement of the caps incident to the alignment and propulsion thereof as already referred to. A cross member 35a connects the free or delivery ends of the guides 24 which project a short distance beyond said cross member as shown in Figure 6.

The cap row guides formed by the belt 9, the guide strips 24 and the top guides 35 are, in effect, extended along the remainder of the length of the machine by means of channel iron guide strips 36 (see Figures 6 and 9) which are arranged in mutually facing pairs so as to constitute confining or retaining channels for the cap rows. These channels 36 extend to the end frame of the machine and are secured to a frame cross member 16 as indicated in Figures 11 and 12.

Portions of the bottom flanges of the channels 36 intermediate the lengths thereof are formed with hinged gates 37 (see Figures 11 and 16 to 18, inclusive). Suitable springs such as indicated at 37a are connected between pins carried by the fixed upper flanges of the channels 36 and said gate members 37 to normally hold the gate members in closed, horizontal position as shown in Figures 16 and 17. These gate members are, however, subject to being rocked downwardly to permit discharge of caps supported thereby as indicated in Figure 18.

As shown in Figure 11 a row of caps in edge to edge relationship is delivered into each guide way formed by pairs of channels 36 so as to cause the leading cap to engage a stop 38 and an actuating arm of an electric switch 39. There is an electric switch 39 in each cap row guide so that there are four such switches as shown in the wiring diagram, Figure 28. The switches are in series and control the operation of a pneumatic cylinder which effects reciprocation of the cap carrying structure 12.

The caps in edge to edge position as shown in Figure 11 must be moved rearwardly to relatively spaced position as shown in Figure 12 in order to align them with the underlying rows of jars in the carton. For such cap spacing purposes there is provided a spacing device comprising a frame 40 (see Figures 6 and 11) which is horizontally movably mounted on suitable stationary tracks as, for example, by means of rollers such as indicated at 41. This frame 40 is provided with four longitudinally extending fixed members 42. These members 42 together with the side members of the frame 40 rotatably support a series of shafts 43, 44, 45, 46 and 47. Each of these shafts carry fingers 48 which project therefrom for a length which is sufficient to enter into the underlying caps 10 so as to engage inside of the respective rims of the caps for shifting the same rearwardly to space them as indicated in Figure 12.

The spacing operation is effected by shifting the frame 40 to the right as viewed in Figure 11 and rocking the shafts 43 to 47 and their respective fingers 48 to produce the condition illustrated in Figure 12. This shifting of the frame 40 is effected by actuating a pneumatic cylinder 49 so as to move its piston rod 50 outwardly. This piston rod 50 is equipped with a depending pusher head 51, the lower end of which engages the adjacent end portion of the frame structure 40 as best shown in Figures 11 and 12. Springs 52 stretched between pins projecting from portions of the movable frame 40 and the stationary frame structure 16 serve to yieldingly resist movements of the spacer frame in the manner described and retract said spacer frame to starting position when the piston 50 and pusher head 51 are retracted.

The spacing pins 48 are normally held in the inactive position within the confines of the movable frame 40 as shown in Figure 11 by means of springs 53 which are stretched between fixed points on the movable frame structure 40 and short arms 53a which project from the respective shafts 43 to 47, inclusive (see Figure 13 and Figure 6). As shown in Figure 6, the springs 53 for the shafts 43, 44, 46 and 47 are located adjacent one side of the movable frame whereas the spring 53 for the shaft 45 is located intermediate adjacent oppositely facing pairs of channels 36.

The shafts 43 to 47 inclusive together with their respective fingers 48 are rocked against the tension of said springs 53 as an incident to movement of the frame 40. To that end, the shafts 44, 46 and 47 are provided with upwardly extending arms such as indicated at 54 (Figures 6 and 14) and the shafts 43 and 45 are provided with downwardly extending arms 55 (Figures 6 and 15). The upwardly extending arms 54 engage abutments such as indicated at 56 (Figure 6) carried by the main frame structure and the downwardly extending arms 55 engage abutments such as indicated at 57 (Figures 6 and 15). These abutments 56 and 57 are properly located to cause the pins or arms 48 to engage the caps 10b and 10c (Figures 11 and 12) in the proper timed relationship so as to shift said caps rearwardly into the proper spaced relationship. The arm 48 on the shaft 47 engages the cap 10d and shifts the entire supply row rearwardly so as to completely free the three caps 10a, 10b and 10c for subsequent delivery to the cap carrying mechanism by which the caps are applied to the jars. The cap 10d and those in back of it which are urged forwardly by the belt 9 remain stationary, the belt 9 slipping under the caps which are held against movement.

During the time that the spacing mechanism 40 is operating, the cap carrier and applying mechanism 12 is being elevated to ultimately assume the position shown in dotted lines in Figure 12. The carrier structure 12 in this elevated position presents the cap receiving cups 13 in upwardly facing position in which the caps 10a, 10b, and 10c may be dropped into the respective underlying cups. Such delivery of the caps to the carrier cups is effected while the cups remain in upwardly facing position near the upper limit of elevation of the carrier, by rocking the flange gates 37 of the channels 36 downwardly to permit the caps to drop from said channels into the underlying cups 13 (see Figures 16, 17 and 18).

The gates 37 are rocked downwardly by means of another pneumatic cylinder indicated at 58 (Figures 6 and 15) which has a piston rod 59 provided with a depending pusher head 60. This pusher head 60 is provided with a recess 61 in which there is trapped the free end of a lever 62 which extends from a rotatably mounted rod 63, the latter being rotatably mounted in the stationary frame structure including the stationary channel members 36. This rod 63 is equipped with a series of levers 64 (Figures 16, 17 and 18) which project into overlying relation to the various gates 37 and are operative upon rocking of the rod or shaft 63 to rock the gates downwardly from the cap supporting horizontal position shown in Figures 16 and 17 to a cap discharging position such as represented in Figure 18. In Figure 18 the gate 37 is shown in its partially open position and it will be understood that the arms or levers 64 force the gates open sufficiently to permit the caps 10 to drop out of the guides 36 into the carrier cups 13.

Figure 9:
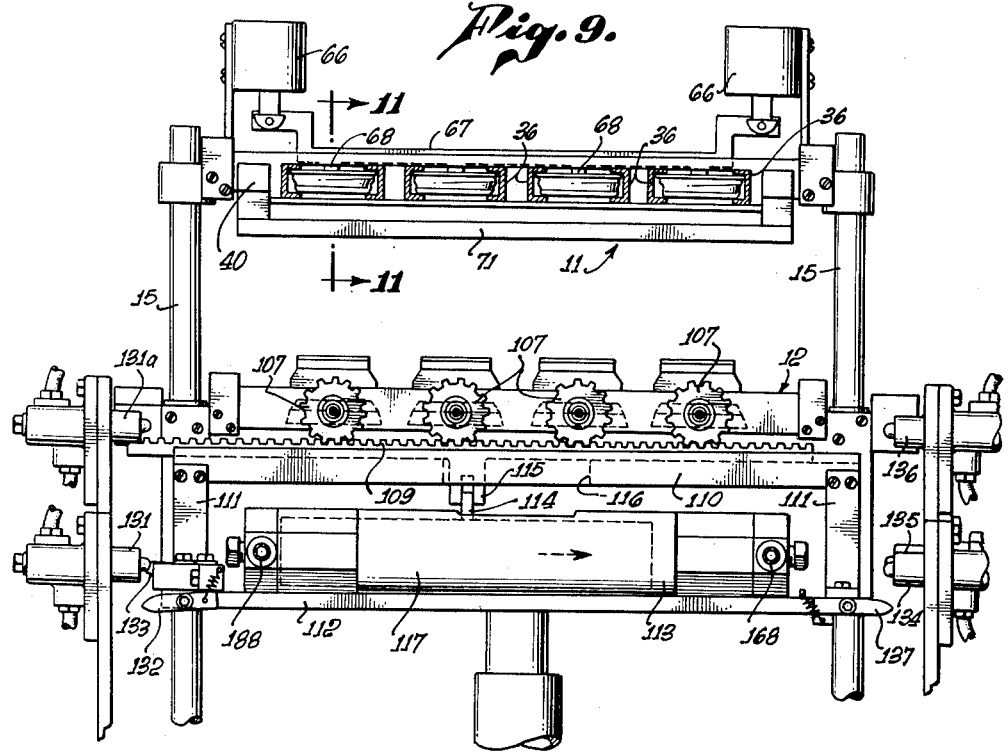
Figure 9 is a section on the lines 9—9 of Figures 6 and 8.

Suitable electric switches such as indicated at 65 (Figure 16) are associated with each of the gates 37 and are adapted to be opened when the gates are closed or in horizontal position. In the event that one of the gates 37 should fail to close properly under the force of its spring 38, the switch 65 associated with such gate would remain closed to complete an electric circuit to a pair of solenoids 66 which control a gate 67 (Figures 6, 9 and 10) for stopping the flow of caps even though other conditions would permit the caps to flow into the guide channels 36. As shown in the diagram Figure 28, these switches 65, there being one for each of the eight flange gates 37 of the present embodiment of the apparatus, are in parallel so that in the event that any one of the switches is permitted to remain closed, the solenoids 66 which control the gate 67 would remain energized and the gate 67 held down in cap holding position. This gate 67 consists of a cross member provided with depending ears or tongues 68 (Figures 9 and 10) and with upwardly offset end portions connected to the armatures or plungers of the solenoids 66. When the solenoids are energized the gate 67 will be moved downwardly as indicated in Figure 9 to cause the ears 68 to enter into the interior of the underlying caps 10 so that forward movement of said caps 10 will be arrested by engagement of the cap rims with said ears.

Horizontal travel of the cap spacing frame 40 as shown in Figures 11 and 12 may be controlled entirely by the extent of movement imparted to the piston 50 and its pusher head 51. However, it is preferred that positive stops be provided such as indicated at 69 and 70. The stationary frame structure 16 which supports the horizontally reciprocable spacer frame 40 is strengthened by means of a plurality of transverse cross members or braces 71 which are properly spaced to permit the caps when spaced as shown in Figure 12 to pass between such braces. As indicated in Figure 12, the cap carrier structure 12 with its cups 13 is moved upwardly so as to project the cups 13 into the spaces between said braces 71. Upon downward movement of the cap carrier and cups 13, the braces 71 will serve, in the event that a cap has not been properly deposited in the cup 13, to shift such cup laterally sufficiently to cause it to drop into the cup. For that purpose, the braces 71 are provided with chamfered cap guide portions 71a.

Figure 7:
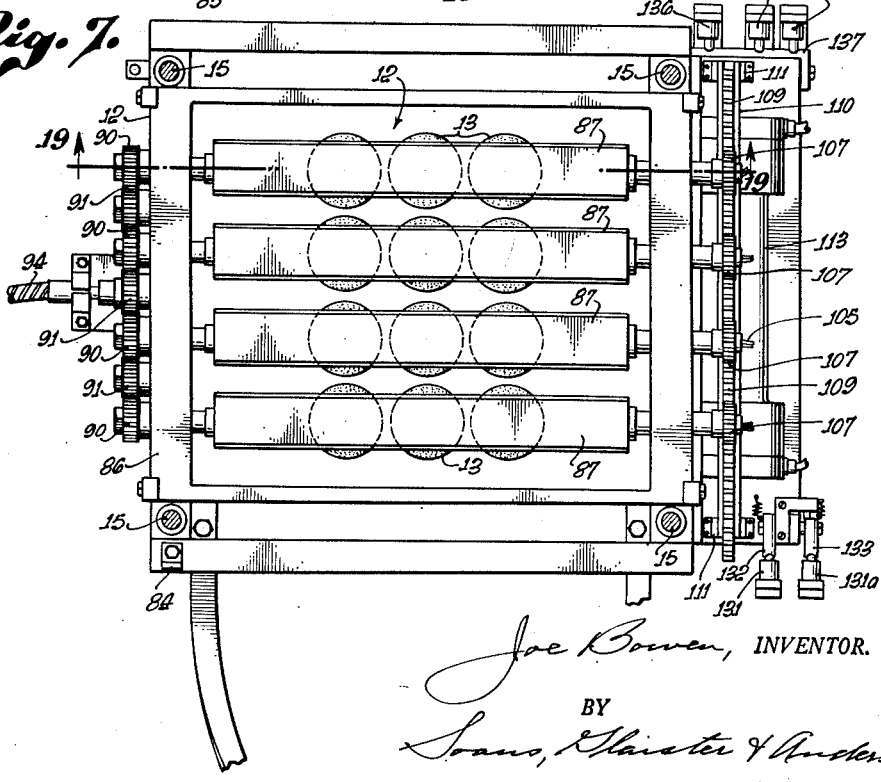
Figure 7 is a section on the lines 7—7 of Figures 5 and 8.

The portion of the frame structure 16 which supports the horizontally shiftable spacing frame 40, is fixedly mounted by being secured to the four vertically extending posts 15 as can best be understood by reference to Figures 5, 6 and 7. These posts 15 are supported by sub-portions of the main frame 16 which also support other portions of the mechanism as shown.

Figure 8:
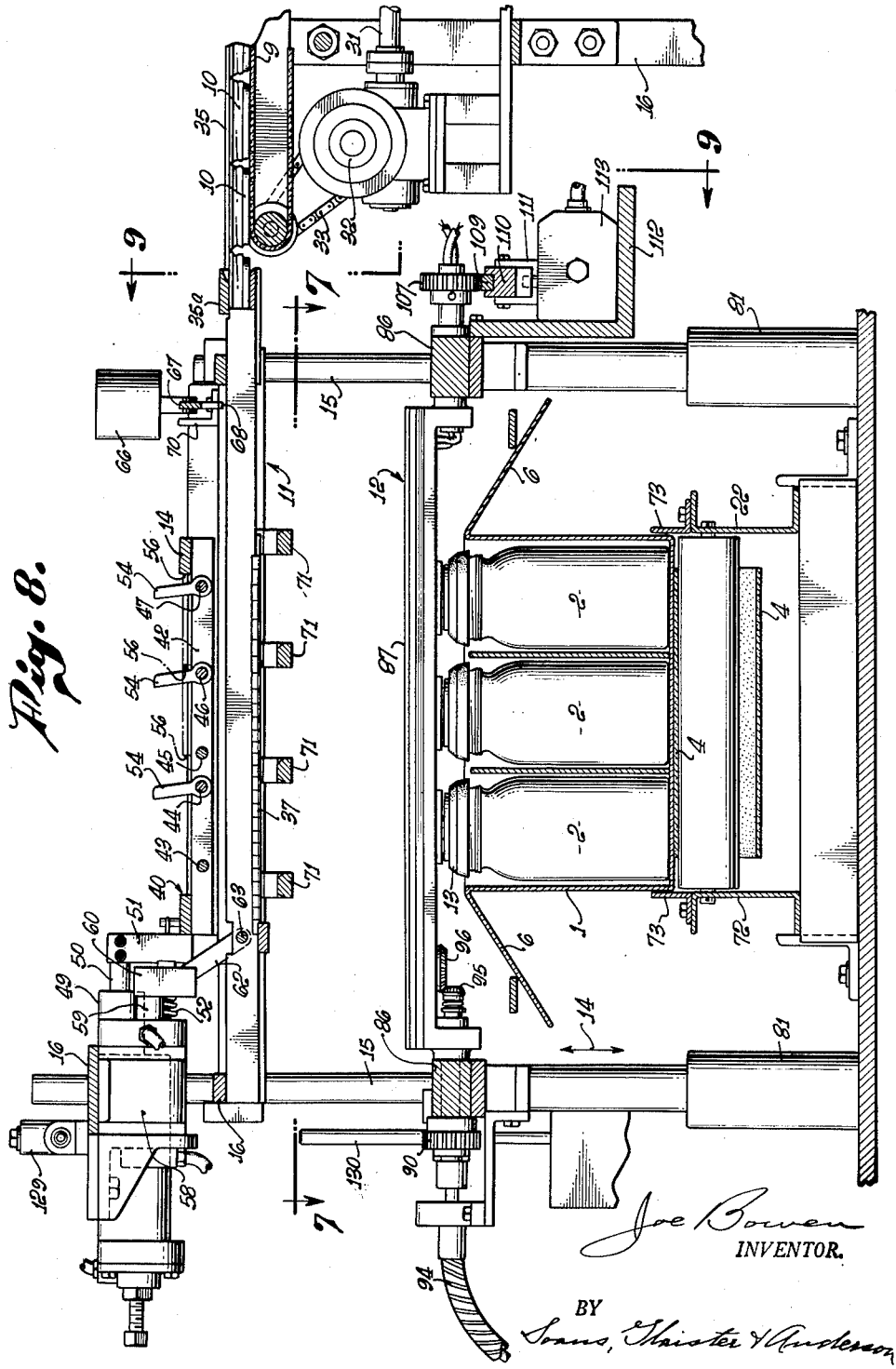
Figure 8 is a section on the lines 8—8 of Figures 5 and 6.

The conveyor belt 4 which carries the jar loaded cartons into the machine is suitably supported by conveyor rollers and intermediate supporting rolls to prevent sagging of the upper reach of the belt as shown in Figures 8 and 23. This conveyor belt structure is mounted on the sub-frame 16 in fixed position thereon so that all of the cartons enter at the same level or elevation into the zone of operation of the machine. The conveyor includes side frame elements 72 and box guide elements 73 as best shown in Figures 5 and 8.

The loaded cartons are successively stopped in the required relationship to the cap applying mechanism by means of stop mechanism illustrated in Figures 23 to 26 inclusive. The stop means comprises an angle member having a vertically upwardly extending flange 74 mounted on the upper end of a piston rod 75 which is reciprocated vertically by means of a pneumatic cylinder 76 and a piston head attached to the said piston rod within said cylinder. The stop flange 74 is provided at its opposite ends with a pair of anti-friction rolls 77 which projects slightly beyond the face of the stop flange 74 so as to be engageable with the box ends and to move up and down thereon without an abrading action on the boxes. Said vertical flange 74 also carries an electric switch 78 (Figure 26) which is adapted to be closed by means of a button 79 when engaged by a box 1. The box 1 will force the button forwardly until the box comes into engagement with the stop roller 77 by which time the switch 78 will have been closed. This switch is in series with another switch 80 (Figure 28) and cooperates therewith to control an air valve which partially governs the downward movement of the cap carrier structure 12. The switch 80 is mounted on a portion of the stationary frame 16 (see Figure 5) and is adapted to be closed by a rod 80a when the cap carrying frame 86 reaches the upper limit of its reciprocating movement. Hence, unless a box containing jars is in proper position in the apparatus the switch 78 will not be closed and the circuit controlling the said air valve will not be completed and the machine will not operate. When a normal jar capping operation is completed, the cylinder 76 is actuated to lower the stop 74 to a position such as illustrated in Figure 24 to thereby permit delivery of the carton 1 containing the newly capped jars to a suitable receiving conveyor such as represented in Figure 23. This cylinder 76 is further automatically actuated so as to cause said stop 77 to rise under the trailing portion of the carton containing the capped jars thereby lifting said trailing portion approximately as shown in Figure 25, thereby to return said stop 77 to its operative position in the path of travel of the next succeeding carton.

During the cap applying position, the cap carrier structure 12 is in the down position in which it is illustrated in Figures 5, 8 and 9. This cap carrier 12 is vertically slidably mounted on the posts 15 and it is actuated by a pair of pneumatic cylinders 81 (Figures 5 and 27). When the carrier 12 reaches its lowermost position an abutment 82 (Figure 5) on the carrier, actuates a valve 83 which initiates upward movement of the carrier 12, and when the carrier reaches its uppermost position downward movement is automatically initiated by engagement of another abutment 84 with a valve 85.

The cap carrier structure 12 is quite similar to that shown in my aforesaid pending application. It includes a horizontal rectangular frame 86 and a plurality of cup supporting cradles 87 (see Figures 7, 19 and 20). These cradles 87 have end portions 88 which extend laterally from the general plane of the main bodies of the cradles 87 and these end portions 88 are rotatably mounted so as to permit the cradle to be rotated through an arc of 180° from the position shown in Figure 19 in which the cups 13 face upwardly to the inverted position shown in Figure 8 in which the cups 13 face downwardly. At one end, the cradles 87 are rotatably mounted on shafts 89 which are journalled in one end portion of the frame 86. Each shaft 89 is provided on its outer end with a spur gear 90 and these spur gears 90 mesh with intermediate idler pinions 91 (Figures 5 and 7) so that all of the shafts 89 will be simultaneously rotated in the same direction if any one of the gears 90 and 91 is driven.

As shown in Figures 5 and 7, provision is made for driving the intermediate or central idler gear 91. This provision comprises an electric motor 92 which is connected through the agency of a magnetic clutch unit 93 to a flexible shaft structure 94, the other end of which is connected to said central idler gear 91. The motor 92 is preferably continuously driven and the drive of the gears 91 and 90 and hence of the shafts 89 is controlled by energizing and de-energizing the magnetic clutch 93.

The inner end of each shaft 89 is provided with a beveled gear 95 (Figure 19) which meshes with a cooperating beveled gear 96 which is suitably journalled in the cradle 87 by means of a shaft 97 which is provided at its other end with a sprocket 98. The sprocket 98 drives a chain 99 which meshes with sprockets 100 (see Figures 19 and 20) carried by shaft elements of the cups 13 so that said cups will be rotated when said shafts 89 are driven. The chain 99 is guided around an additional sprocket 101 and guide rolls or wheels 102 and a guide block 103 which are suitably mounted in the cradle structure 87.

Each of the cups 13 embodies an electro-magnet, a portion of which is represented at 104 and these magnets are energized by current delivered thereto by means of a conductor 105 and suitable connections embodied in the cradle structure. The conductor 105 passes through a hollow shaft 106 at the other end of the cradle and thence to suitable connections with a source of direct current for operating the magnets 104. The tubular shaft 106 is journalled in the frame member 86 for rotation and at its outer end is equipped with a spur gear 107 by means of which said shaft 106 and the cradle is rotated through the arc of 180° as already mentioned. The cradle end portion 88 which engages the tubular shaft 66 is of course secured fixedly to said tubular shaft 106 in any suitable manner as for example by means of a set screw 108.

The gears 107 of the four cup carrying cradles are in mesh with a rack bar 109 (Figures 7, 8, 9 and 10) which is horizontally slidably mounted in a suitable guide or track 110. The guide or track 110 is fixedly supported by means of suitable brackets such as indicated at 111 from a platform 112 which, as shown in Figure 8, is secured to a portion of the vertically reciprocating frame structure 86. A pneumatic cylinder 113 is also mounted on the platform 112 and is provided with a connection 114 to a lug 115 which depends from the rack bar 109 through a slot 116 in the guide member 110. The connection 114 is carried by a piston 117 in the cylinder 113 and said piston is adapted to be reciprocated to thereby reciprocate said rack bar 109 sufficiently to rotate the cup carrying cradles through the said arc of 180° alternately in opposite directions.

Figure 10:
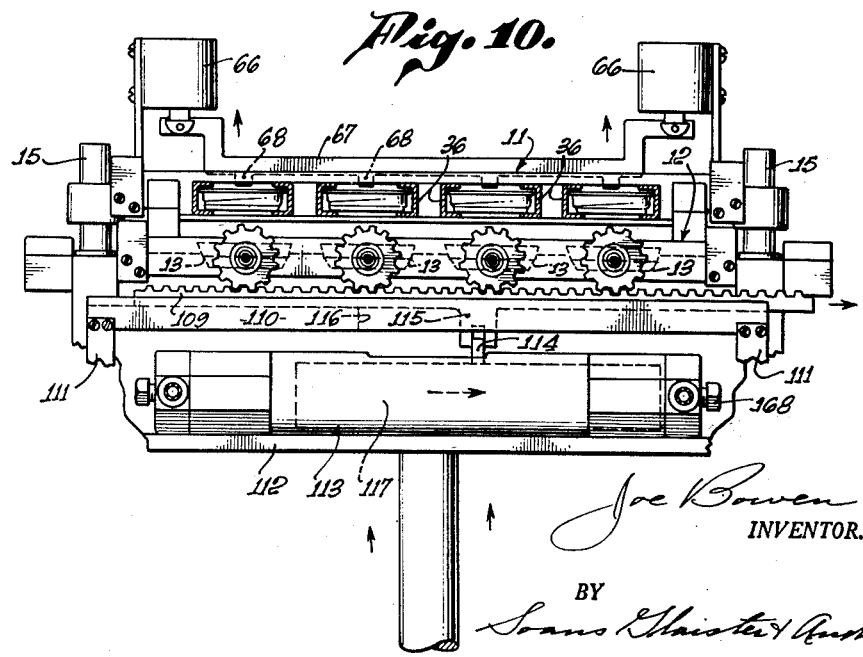
Figure 10 is a view similar to Figure 9 but showing the parts in a changed position.

If the parts as shown in Figure 8 have just completed a cap applying operation, the next movement will be that of starting the frame 86 upwardly on its guide posts 15 and at the same time or very shortly thereafter the cylinder 113 will be actuated to shift the rack bar 109 to rotate the carriers 12 through an arc of 180° so as to present the cups 13 in an upwardly facing direction such as shown in Figure 19 and in Figure 10. This rocking movement of the cup carriers is completed shortly before they reach their upper limit of movement in which they are shown in Figure 10 and from which figure it can be seen that the cups are respectively aligned with the four rows of caps so that they are in readiness to receive a set of caps from the cap spacing structure.

The magnetic clutch 93 and the supply of current to the cap holding magnets in the cups 13 is controlled by a pair of mercury switches 118 and 119 (Figure 5) which are carried by a lever 120 pivoted intermediate its ends as indicated at 121 on a main frame bracket. The outer or free end of the lever 120 carries a pin 122 which is adapted to engage a detent 123 on a latch lever 124 which is pivoted at its lower end as indicated at 125 on the supporting frame bracket just referred to. Suitable spring means (not shown) carried by the pivot 125 and acting against the latch arm 124 tends to rock said arm outwardly into engagement with said pin 122.

In Figure 5 the switches 118 and 119 are shown in their open circuit position, the switches having been permitted to assume that position upon disengagement of the latch arm 124 from the pin 122 on the switch lever 120. Such disengagement is effected by engagement of a pawl 126 on a rod 127 with the upper end of said latch lever. Said rod 127 depends from the vertically reciprocating frame 86 so that said pawl 126 moves vertically in unison with the frame structure 86 and causes operative engagement between said pawl 126 and latch lever upon termination of the downward movement of said frame 86. The rod 127 carries another pawl 128 near its lower end which is operative during an early part of the downward movement of the frame 86 to engage the free end of the switch lever 120 to rock it downwardly until the said pin 122 locks under the detent 123 of the latch arm 124 to hold the lever 120 and the switches 118 and 119 in circuit closing position. Hence, the magnets 104 in the cups 13 are energized early in the downward movement of the frame to hold the caps in place in the cups during the inverting movement of the cap carriers. The magnetic clutch 93 is similarly energized so that rotation of the cups is initiated during the early portion of the downward movement of the cap carrying structure. Hence, when the caps reach the mouths of the jars they are in rotation and will readily be screwed home on the jar mouths.

Another valve 129 (Figure 5) is mounted on the upper end of one of the posts 15 and is adapted to be actuated by an upwardly extending rod 130 carried by the vertically reciprocated frame 86. The functioning of this valve 129 will presently be explained. A pair of valves 131 and 131a (Figure 9 and Figure 7) are provided for controlling horizontal reciprocation of the rack bar 109 and hence turning of the cap carriers during the up and down movement of the cap carrying structure 12. Spring biased pivoted fingers 132 and 133 are suitably mounted on the platform 112 and are respectively adapted to actuate the valves 131 and 131a. After the cap carrier 12 has moved upwardly sufficiently to withdraw the cups 13 from the capped jars, the finger 132 engages the valve 131 to initiate reverting of the cap carrying cups to upwardly facing position. As the cap carrying structure 12 approaches its uppermost position, the finger 133 is permitted to rock on its pivot and to pass the valve 131a so that the valve is not actuated during upward movement of the cap carrier structure and said finger 133 travels to a position slightly above said valve 131a. Shortly after downward movement of the cap carrier 12 has started, said finger 133 will actuate said valve 131a to initiate rocking or inverting of the cap carrying cups from the upwardly facing position shown in Figure 10 to the downwardly facing position shown in Figure 9. Valves 134, 135 and 136 are mounted on the other side of the machine and are adapted to be actuated by a spring biased finger such as represented at 137 carried by the vertically shifting platform 112.

*The cycle of operation*

The general operation of the apparatus, that is to say, the sequence of operations may best be described with reference to Figures 27, 28 and 29.

As shown in the wiring diagrams, Figures 28 and 29, various manually operable and manually or automatically (thermally) operable cut-off switches are provided in the various circuits for control and safety purposes. It may be assumed that these safety switches are normally closed during operation of the machine and may be employed for starting and stopping purposes. Starting may be effected by closing the main switch 138 which sets in motion all of the various driving motors and causes resumption of machine operation from whatever position it may have been left in when stopped upon completion of the previous run.

Assuming that when the machine is started up, the cap carrier is in a low intermediate position and that it was left on its way up, its upward movement will be resumed and continued until the abutment 84 actuates the valve 85. During the early part of this upward movement of the cap carrier, the trigger finger 137 (Figure 9) actuates the valve 135 (Figure 27) to permit the flow of compressed air therethrough. Compressed air enters said valve from a main supply line 139 which is connected with a manifold 140 from which a pipe connection 141 extends to one side of said valve 135. A pipe line 142 extending from the other side of said valve 135 communicates with a piston type valve 143 in such a way as to shift a piston within the valve cylinder to permit the establishment of communication between a pipe 144 which leads from the main compressed air supply line 139 to the valve body 143 and a pipe line 145 which communicates with the cylinder 49 at its rear end so as to force the piston 50 outwardly to effect cap spacing as already explained.

Slightly further movement of the cap carrier structure upwardly causes its upwardly extending plunger rod 130 (Figure 5) to actuate the valve 129. When this valve 129 is opened compressed air flows from the manifold 146 (Figure 27) through a pipe line 147, through the valve 129 and through a pipe line 148 to one end of a piston type valve 149. Compressed air entering the end of the valve cylinder 149 to which the pipe line 148 is connected causes a piston to shift so as to establish communication between a pipe line 150 which extends from the manifold 146 to the central portion of the valve body 149 and thence through a pipe line 151 to the rear end of the cylinder 58 whereby its piston rod 59 and pusher head 60 will be moved outwardly to thereby effect opening of the cap discharging gates 37 in the manner shown in Figures 15 to 18 inclusive.

A set of caps facing upwardly will thereby be deposited in the cap conveying cups 13. At about the same time that the valve 129 is actuated, the valve 85 is also actuated by the abutment 84 (Figure 5). When this valve 85 is opened, compressed air is permitted to flow from said manifold 146 through a pipe line 154 and an electrically controlled valve 155 in said pipe line, through the valve 85 and thence through another pipe line 156 into one end of a piston valve 157. A piston within the cylinder 157 is thereby shifted to establish communication between ports in the valve which are connected by a pipe line 158 to the main compressed air line 139 and a pipe line 159 which leads from said cylinder valve 157 to the upper end portions of the cylinders 81 which effect vertical reciprocation of the cap carrier structure. As shown in Figure 27, the pipe line 159 has two branches 159a and 159b in which the air pressure is equalized by means of suitable equalizing valves 160 and each of these branches is itself further divided to provide a connection 161 with the upper end of the cylinder 81 and a connection 162 with a portion of the cylinder slightly below its upper end. The connection 161 is equipped with a further valve 163 to reduce the air pressure so as to cause gradual starting of the piston movement within the cylinder followed by more positive movement when the port connecting the branch line 162 is uncovered after a short length of movement of the piston. Hence, smooth action is obtained in respect of the change of direction of movement of the vertically reciprocating cap carrier structure.

The electrically controlled valve 155 in the pipe line 154 which supplies air to actuate the control valve 157 for initiating downward movement of the cap carrier structure is controlled by the electric switches 78 and 80. The switch 78 is a part of the box stopping apparatus shown in Figures 23 to 26, inclusive. In the event that there is a lack of a box of jars to be capped, the switch 78 will not be closed and the valve 155 will not be opened so that down movement of the cap carrier will be prevented. The switch 80 is closed only when the vertically reciprocable cap carrying frame 86 reaches the upper limit of its movement to position the cap carrying cups 13 in receiving position. If for any reason the frame 86 fails to reach the required elevated position, the switch 80 will remain open and the valve 155 will not be opened and downward movement of said cap carrying frame 86 cannot, therefore, be prematurely started.

As the cap carrier structure begins its downward movement or shortly thereafter, the pawl 133 (Fig. 9) actuates the valve 131 (Figures 9 and 27) to permit the flow of air therethrough. When the valve 131 is opened, air will flow through a feed line 164 (Figure 27) from the main pressure supply line 139 to the valve and thence through a pipe line 165 which leads from the valve to one end of a cylinder valve 166. Compressed air thus admitted to one end of the valve 166 moves a piston in the valve to the opposite end thereof so as to establish communication between ports one of which is an inlet port connected by a pipe line 167 to the aforementioned supply pipe 158 and the other of which is an outlet port which is connected by a pipe line 168 which extends to one end of the cylinder 113 which controls the cup inverting rack 109 (Figure 10). The piston 117 in said cylinder 113 is thereby shifted to effect movement of the rack bar 109 to rotate the cap carrying cups 13 from upwardly facing position to downwardly facing position to present the caps properly to the underlying jar mouths.

When the downward movement of the cap carrying structure starts or very shortly thereafter, the cup magnets 104 which hold the caps in the cups are energized incident to actuation of the switch lever 120 (Figure 5) by the pawl 128, and the magnetic clutch 93 is also thereby energized so that the motor 92 will start to effect rotation of the cap carrying cups so that when the caps engage the jar mouths they will be screwed home on the same.

Downward movement of the cap carrying structure 12 continues until the abutment 82 (Figure 5) opens the valve 83 whereupon compressed air will flow through the pipe line 169 (Figure 27) from the manifold 146 through the valve 83 and thence through a pipe line 170 to one end of a piston valve structure 171. This piston valve structure is somewhat different than the piston valves 149, 157 and 166 previously referred to, but its ultimate function when actuated by pressure fluid delivered through the said pipe line 170, is to cause the flow of pressure fluid through a pipe line 172 and an electrically actuated valve 173 in said pipe line 172, to the piston valve 157. Pressure fluid thus delivered to the valve 157 shifts the valve piston so as to establish communication between the pressure fluid inlet line 158 and a discharge line 174. This pipe line 174 has branches 174a and 174b which communicate with the lower ends of the cylinders 81 to effect upward movement of the pistons therein and hence upward movement of the cap carrier structure.

The piston valve 171 is so constructed that it acts slowly after opening of the valve 83, to establish the flow of air through the pipe line 172 as aforesaid. This retarded action of the valve 171 causes the terminal portion of the downward movement of the pistons in the cylinders 81 and of the cap carrying structure 12 to be greatly retarded while the caps are being screwed home on the jars. There is in effect a momentary holding of the cap carrier in said lowermost position before upward movement can be actually initiated incident to opening of the valve 83 in the manner indicated in Figure 5. The said retarded action of the valve 171 is attained by forming an air cushion on the side of the valve piston which is remote from the side to which air is delivered by the pipe line 170. This is effected by restricting the escape of air from said air cushion, as by means of a pipe line 175 having therein an adjustable relief valve 176 whereby the rate of air escape from said cushion may be adjusted to determine the speed of action of said valve 171. When the piston in the valve 171 completes its retarded movement, a valve 177 is opened to establish communication between said pipe line 172, an extension 172a thereof, and the pressure supply line 139.

During an early portion of the upward movement of the cap carrier, the trip 137 (Figure 9) actuates the valve 134 (Figures 9 and 27) so as to permit compressed air to flow from the manifold 140 through a pipe line 178 and thence through a pipe line 179 to one end of a cylinder valve 180. Air entering the cylinder 180 through the pipe line 179 shifts a piston in the cylinder so as to establish communication between the compressed air feed line 181 and the compressed air delivery line 182 which extends from the cylinder valve 180 to the upper portion of the cylinder 76. Air entering the upper portion of the cylinder 76 effects lowering of the piston 75 and the stop 77 (see Figure 23) so as to permit the box containing capped jars to move forwardly as indicated in Figure 24. The valve 135 which controls operation of the cap spacing mechanism is next actuated as already described so as to have the caps spaced and in readiness for deposition in the cap carrying cups when the latter reach their uppermost positions.

The valve 136 is actuated by the pawl 137 shortly before completion of the upward movement of the cap carrier to permit the passage of air from said manifold 140 through a pipe line 183, the valve 136, and thence through a pipe line 184 which leads to the other end of said cylinder valve 180. Compressed air thus delivered to the valve 180 shifts the piston therein in such a manner as to establish communication between the compressed air supply line 181 and a delivery pipe line 185 which communicates with the lower end of the box stop actuating cylinder 76. Hence, just before upward movement of the cap carrier is completed, the box stopping members 77 will be elevated so as to engage and elevate the rearward portion of the carton being discharged as indicated in Figure 25 whereby said box stopping members are positioned in the path of travel of the next succeeding jar containing carton 1. The next succeeding jar carton is thereby stopped in proper position for capping.

The action for reverting the cap receiving cups to upwardly facing position, which takes place shortly after the cap carrier has started its upward movement, is accomplished by means of the trip 132 which actuates the valve 131 (see Figures 9 and 27). Compressed air is delivered to said valve 131 through a pipe line 186 which branches from the pipe line 172, and is discharged from said valve 131 through a pipe line 187 which communicates with one end of the cylinder 166.

Air so delivered to the cylinder 166 shifts the piston therein so as to establish communication between the compressed air supply line 167 to said cylinder and an outlet pipe 188 which communicates with one end of the cylinder 113. Air delivered to the cylinder 113 through the pipe line 188 serves to shift the piston 117 in said cylinder and thereby to slide the rack bar 109 to the right from the position shown in Figure 9 to the position shown in Figure 10, thereby to turn the cap receiving cups from downwardly facing to upwardly facing cap receiving position.

In the wiring diagram, Figure 28, there is shown a circuit including a motor-generator set 189 which provides the direct current for the circuits shown in Figure 29 where the generator portion of said motor generator set is also indicated by the reference numeral 189. This motor-generator set, although not shown in the drawings of the apparatus, is built into the same so that the apparatus is ready for operation in areas or places where alternating current alone is readily available. Various test circuits, such as shown in the lower portion of Figure 29, may be incorporated and the wiring, both the alternating current and direct current circuits, may be routed through a switchboard or panel (not shown) on the machine, which panel may be equipped with signal devices such as indicator lights included in the various circuits to show at a glance whether or not all electrical circuits are functioning properly.

The described actuating mechanism may of course be varied in many respects but it has been found to be an efficient and satisfactory system. Pressure control or regulating valves may be incorporated where desired in the pressure fluid piping system, some such regulators being indicated in Figure 27 but not herein specifically mentioned. Suitable safety devices are embodied in the actuating mechanism to prevent operation of the apparatus in the absence of jars to receive the caps and in the absence of caps for application to the jars. The mechanism described also involves safety devices to stop operation of the cap feeding mechanism in the event that caps pile up on the first feeding belt or in the event that an excessive number of caps happen to drop from one of the magazines to said feeding belt instead of just a single cap.

The apparatus described is subject to variation in many respects within the skill of the machinery builder.

I claim:

1. In apparatus of the class described, the combination of a tubular magazine for receiving and guiding a stack of caps, a plurality of endless belts having substantially parallel reaches extending longitudinally of said stacks and in gripping engagement with peripherally spaced portions of the rims of a plurality of the lowermost caps in said magazine to support said stack in said magazine, a plurality of substantially co-planar guides for the lower end portions of said parallel belt reaches arranged to guide said lower end portions gradually away from said stack, means for effecting unitary travel of said parallel belt reaches downwardly and under said guides, whereby the lower caps of said stack will be successively released from said belts and discharged from said magazine, and means for receiving said discharged caps for delivery to other apparatus.

2. In apparatus of the class described, the combination of a tubular magazine for receiving and guiding a stack of caps, cooperating means engageable with peripherally spaced portions of the rims of a plurality of the lowermost caps in said magazine to support said stack in said magazine, means for effecting unitary downward movement of said cooperating means to lower the stack of caps in said magazine, means whereby the successive bottom caps in the stack are released from said cooperating means, a conveyor movable transversely of said magazine under the lower end thereof for receiving the caps released by said cooperating means, means for actuating said conveyor so as to feed said caps successively in a row laterally from said magazines, and detecting means adjacent said conveyor in the area which receives the caps as aforesaid and adapted to be actuated as an incident to depression of said conveyor by excess cap weight in the event that a plurality of said caps are released and delivered as a unit to said conveyor, and means responsive to actuation of said detecting means for stopping the release of caps by said cooperating cap supporting means.

3. In apparatus of the class described, the combination of a tubular magazine for receiving and guiding a stack of caps, cooperating means engageable with peripherally spaced portions of the rims of a plurality of the lowermost caps in said magazine to support said stack in said magazine, means for effecting unitary downward movement of said cooperating means to lower the stack of caps in said magazine, means whereby the successive bottom caps in the stack are released from said cooperating means, a conveyor movable transversely of said magazine under the lower end thereof for receiving the caps released by said cooperating means, means for actuating said conveyor so as to feed said caps successively in a row laterally from said magazine, and means overlying the path of travel of said row of caps and adapted to be actuated so as to stop the operation of said conveyor in the event that stacked or overlapped caps are advanced by said conveyor.

4. In apparatus of the class described, the combination of a cap feeding means for longitudinally advancing a row of caps which are disposed in edge-to-edge relationship, means for receiving a plurality of the caps in said row and for effecting spacing of said caps into and maintenance thereof in predetermined spaced relationship, and means for effecting discharge of said row of spaced caps from said receiving means in said spaced relationship for delivery to similarly spaced containers.

5. In apparatus of the class described, the combination of a cap feeding means for longitudinally advancing a row of caps which are disposed in edge-to-edge relationship, normally stationary guide means for receiving said row of caps from said cap feeding means, means associated with said guide means and movable relative thereto for effecting movement of certain of the caps in said guide means to position said certain caps in predetermined spaced relationship in said guide means, and means for effecting discharge of said row of spaced caps from said guide means for application to a row of similarly spaced containers.

6. In apparatus of the class described, the combination of a cap feeding means for longitudinally advancing a row of caps which are disposed in edge-to-edge relationship, normally stationary guide means for receiving said row of caps from said cap feeding means, means associated with said guide means and movable relative thereto for effecting rearward movement of certain of the caps in said guide means to position the caps in said row in predetermined spaced relationship in said guide means, and means for effecting discharge of said row of spaced caps from said guide means for application to similarly spaced containers.

7. In apparatus of the class described, the combination of means for positioning a row of containers with open upper ends in predetermined spaced relationship, cap feeding means for longitudinally advancing a row of caps which are disposed in edge-to-edge relationship, normally stationary guide means overlying said container positioning means for receiving said row of caps from said cap feeding means, means associated with said guide means and movable relative thereto for effecting rearward movement of certain of the caps in said guide means to position the caps in said row in conformity with the spaced relationship of said containers, cap transfer means intermediate said guide means and said container positioning means for receiving said row of spaced caps from said guide means and for delivering and applying said row of caps to said containers, and means for effecting discharge of said spaced caps from said guide means to said transfer means.

8. In apparatus of the class described, the combination of means for positioning a row of containers with open upper ends in predetermined spaced relationship, cap feeding means for longitudinally advancing a row of caps which are disposed in edge-to-edge relationship, normally stationary guide means overlying said container positioning means for receiving said row of caps from said cap feeding means, means associated with said guide means and movable relative thereto for effecting rearward movement of certain of the caps in said guide means to shift said certain caps to the spaced relationship of said containers, cap transfer means intermediate said guide means and said container positioning means mounted for reciprocation alternately into proximate, cooperative relationship to said guide means and to the upper ends of containers positioned as aforesaid, whereby said guide means is adapted to receive said spaced caps from said guide means and to apply such caps to said containers, means for effecting delivery of the spaced caps to said transfer means, means for effecting reciprocation of said transfer means as aforesaid, and means actuated by the caps in said guide means for controlling the operation of said transfer means.

9. In apparatus of the class described, the combination of means for positioning a row of containers with open upper ends in predetermined spaced relationship, cap feeding means for longitudinally advancing a row of caps which are disposed in edge-to-edge relationship, normally stationary guide means overlying said container positioning means for receiving said row of caps from said cap feeding means, means associated with said guide means and movable relative thereto for effecting rearward movement of certain of the caps in said guide means to shift said certain caps to the spaced relationship of said containers, cap transfer means intermediate said guide means and said container positioning means mounted for reciprocation alternately into proximate, cooperative relationship to said guide means and to the upper ends of containers positioned as aforesaid, whereby said transfer means is adapted to receive said spaced caps from said guide means and to apply such caps to said containers, said guide means being provided with ledges for supporting the caps, gates in said ledges adapted to be rocked to discharge the spaced caps from said guide means for delivering such caps to said transfer means, means for rocking said gates as aforesaid, means controlled by said gates for stopping the flow of caps to said guide means while said gates are rocked to cap discharging position, and means for effecting reciprocation of said transfer means as aforesaid.

10. In apparatus of the class described, the combination of a continuously propelled conveyor, means for depositing caps one by one on said conveyor in mutually spaced relationship in a row, a second conveyor adapted to receive the caps in a row from said first mentioned conveyor, means for propelling said second conveyor at a slower rate of travel than said first mentioned conveyor so as to cause said caps to become assembled in edge-to-edge relationship in a row on said second conveyor, normally stationary cap guide and holding means for receiving the cap row from said second conveyor, the aforesaid cap rows being propelled longitudinally of the rows, means for effecting spacing of said caps into predetermined spaced relationship in said cap guide and holding means, and means for effecting discharge of the spaced caps from said holding means for application to similarly spaced containers.

11. In apparatus of the class described, the combination of means for positioning a row of containers with open upper ends in predetermined spaced relationship, means for positioning a row of caps in overlying relationship to said containers with the caps respectively overlying said spaced open ends of the containers and with insides of the caps facing upwardly, cap transfer means mounted for reciprocation alternately into proximate, cooperative relationship to said cap positioning means and to the open ends of said containers, means for effecting such reciprocation of said transfer means, cups carried by said transfer means for receiving the caps from said positioning means, means for effecting delivery of the caps from said positioning means to said cups, means for inverting said cups and the caps therein during downward movement of said transfer means to present said caps to said container ends in position for application thereto, a normally stationary motor, flexible shaft means connecting said motor to said cups for effecting rotation thereof to thereby rotate said caps during the application thereof to said container ends, magnetic clutch means connecting said flexible shaft to said motor, and switch means actuated by said transfer means for controlling said magnetic clutch according to the position of said transfer means.

12. In apparatus of the class described, the combination of means for positioning a row of containers with open upper ends in predetermined spaced relationship, means for positioning a row of caps in overlying relationship to said containers with the caps respectively overlying said container ends, cap transfer means mounted for reciprocation alternately into proximate, cooperative relationship to said cap positioning means for receiving caps therefrom and to cap applying position adjacent the open ends of said containers, means for effecting such reciprocation of said transfer means, means for rotating said caps to screw the same on said containers when said transfer means is in cap applying position, and means for retarding the change of direction of reciprocation of said transfer means when in cap applying position so as to provide a time interval during which the caps may be screwed on said containers as aforesaid.

13. In apparatus of the class described, the combination of means for feeding forwardly a carton containing jars having open upper ends, a vertically reciprocable stop adapted in elevated position to engage the leading end of a carton fed as aforesaid to stop the travel thereof and hold the same in predetermined position, means for automatically applying caps to the jars in a certain positioned as aforesaid, means controlled by said cap applying means for effecting lowering of said stop means upon completion of a cap applying operation to thereby release said carton for continuation of its forward movement, means also controlled by said cap applying means for effecting upward movement of said stop means so as to elevate the trailing portion of the released carton, thereby to place said stop means in position for stopping a succeeding carton having its leading end in engagement with the trailing end of said released carton.

14. In apparatus of the class described, means for successively feeding caps comprising a cap magazine for guiding a stack of caps downwardly, means under said magazine for receiving caps from said magazine, a plurality of endless belts spaced circumferentially around said stack of caps and having reaches which extend longitudinally of said stack in gripping engagement with a plurality of caps in the lower portion of said stack so as to support the stack in said magazine, means for driving said belts so as to cause said reaches thereof to travel downwardly in unison, guides for said endless belts adjacent the upper and lower ends of said cap engaging reaches, the guides for the lower end of at least one of said reaches being arranged to cause a lower portion of such reach to diverge from the engaged cap stack so as to release the grip of such lower portion on the stack, thereby to successively release the successive lowermost caps in said stack as an incident to the travel of said belt reaches, whereby said lowermost caps are successively discharged to said cap receiving means.

References Cited in the file of this patent

UNITED STATES PATENTS

| Number | Name | Date |
|---|---|---|
| 1,095,319 | Erwin | May 5, 1914 |
| 1,393,134 | Johnson | Oct. 11, 1921 |
| 1,634,566 | Wessman | July 5, 1927 |
| 1,942,885 | Tevander | Jan. 9, 1934 |
| 2,251,197 | Nestmann | July 29, 1941 |
| 2,281,725 | Snyder | May 5, 1942 |
| 2,325,050 | Goodwin et al. | July 27, 1943 |
| 2,337,033 | Davies | Dec. 21, 1943 |
| 2,347,391 | Benning | Apr. 25, 1944 |
| 2,600,138 | Tesch | June 10, 1952 |
| 2,609,779 | Goldsworthy | Sept. 9, 1952 |

FOREIGN PATENTS

| Number | Country | Date |
|---|---|---|
| 889,085 | France | Dec. 30, 1943 |